(12) United States Patent
Ponnuswamy

(10) Patent No.: US 10,750,440 B2
(45) Date of Patent: Aug. 18, 2020

(54) DETERMINATION OF MULTICAST AND CODING RATE

(71) Applicant: HEWLETT PACKARD ENTERPRISE DEVELOPMENT LP, Houston, TX (US)

(72) Inventor: Subbu Ponnuswamy, Cupertino, CA (US)

(73) Assignee: HEWLETT PACKARD ENTERPRISE DEVELOPMENT LP, Houston, TX (US)

(*) Notice: Subject to any disclaimer, the term of this patent is extended or adjusted under 35 U.S.C. 154(b) by 0 days.

(21) Appl. No.: 16/409,712

(22) Filed: May 10, 2019

(65) Prior Publication Data

US 2020/0137681 A1 Apr. 30, 2020

Related U.S. Application Data

(63) Continuation of application No. 15/863,595, filed on Jan. 5, 2018, now Pat. No. 10,292,097, which is a continuation of application No. 14/282,846, filed on May 20, 2014, now Pat. No. 9,867,124, which is a continuation of application No. 11/586,017, filed on Oct. 24, 2006, now Pat. No. 8,731,594.

(Continued)

(51) Int. Cl.
*H04W 52/02* (2009.01)
*H04W 72/00* (2009.01)
*H04W 28/18* (2009.01)

(52) U.S. Cl.
CPC ........... *H04W 52/02* (2013.01); *H04W 28/18* (2013.01); *H04W 72/005* (2013.01); *Y02B 70/32* (2013.01); *Y02D 70/00* (2018.01); *Y02D 70/142* (2018.01); *Y02D 70/22* (2018.01); *Y02D 70/23* (2018.01)

(58) Field of Classification Search
CPC ... H04W 52/02; H04W 72/005; H04W 28/18; Y02D 70/22; Y02D 70/142; Y02D 70/23; Y02D 70/00; Y02B 70/32
See application file for complete search history.

(56) References Cited

U.S. PATENT DOCUMENTS 4,176,356 A 11/1979 Foster et al.
4,193,077 A 3/1980 Auerbach et al.
(Continued)

OTHER PUBLICATIONS

ETSI, "Digital cellular telecommunications system (Phase 2+); Universal Mobile Telecommunications System (UMTS); General on Terminal Adaptation Functions (TAF) for Mobile Stations (MS)", TS 127 001 V6.2.0, Technical Specification, (3GPP TS 27.001 version 6.2.0 Release 6), Sep. 2005, 85 pages.
(Continued)

*Primary Examiner* — Christopher M Brandt
(74) *Attorney, Agent, or Firm* — Hewlett Packard Enterprise Patent Department

(57) ABSTRACT

According to one embodiment of the invention, systems and methods are provided for power management for wireless multicast communication. For example, a method for an access point includes receiving a request message from a wireless device, the request message identifying a multicast group of the access point and a desired power-save characteristic of the wireless device; and transmitting an accept message to the wireless device, the accept message accepting the desired power-save characteristic.

20 Claims, 6 Drawing Sheets

Related U.S. Application Data

(60) Provisional application No. 60/843,798, filed on Sep. 12, 2006.

(56) References Cited

U.S. PATENT DOCUMENTS

| | | | |
|---|---|---|---|
| 4,305,052 | A | 12/1981 | Baril et al. |
| 4,814,777 | A | 3/1989 | Monser |
| 5,173,711 | A | 12/1992 | Takeuchi et al. |
| 5,220,340 | A | 6/1993 | Shafai |
| 5,559,800 | A | 9/1996 | Mousseau et al. |
| 5,754,145 | A | 5/1998 | Evans |
| 5,767,809 | A | 6/1998 | Chuang et al. |
| 6,934,752 | B1 | 8/2005 | Gubbi |
| 7,039,407 | B2 | 5/2006 | Sipila et al. |
| 7,298,508 | B2 | 11/2007 | Furukawa et al. |
| 7,385,924 | B1 | 6/2008 | Riddle |
| 7,505,447 | B2 | 3/2009 | Kish et al. |
| 7,986,633 | B2 | 7/2011 | Ryu et al. |
| 2002/0049040 | A1* | 4/2002 | Sugaya ............... H04L 1/0003 455/67.11 |
| 2002/0181637 | A1 | 12/2002 | Nakabayashi |
| 2002/0194361 | A1 | 12/2002 | Itoh et al. |
| 2003/0036385 | A1 | 2/2003 | Uehara et al. |
| 2003/0100267 | A1 | 5/2003 | Itoh et al. |
| 2003/0119452 | A1 | 6/2003 | Kim et al. |
| 2003/0157899 | A1 | 8/2003 | Trossen et al. |
| 2003/0207696 | A1* | 11/2003 | Willenegger ......... H04L 1/0083 455/522 |
| 2003/0228865 | A1 | 12/2003 | Terry |
| 2004/0081154 | A1 | 4/2004 | Kouvelas |
| 2004/0120273 | A1* | 6/2004 | Border ............... H04L 1/0059 370/310 |
| 2004/0209638 | A1* | 10/2004 | Beckman ........... H04W 52/146 455/522 |
| 2005/0053069 | A1 | 3/2005 | Lundby |
| 2005/0111429 | A1 | 5/2005 | Kim et al. |
| 2005/0114537 | A1* | 5/2005 | Griswold ........... H04L 12/1886 709/231 |
| 2005/0135317 | A1* | 6/2005 | Ware ................... H04W 72/005 370/338 |
| 2006/0088019 | A1 | 4/2006 | Liebsch |
| 2006/0156370 | A1 | 7/2006 | Parantainen |
| 2006/0187864 | A1 | 8/2006 | Wang et al. |
| 2006/0215619 | A1 | 9/2006 | Peetz et al. |
| 2006/0221927 | A1 | 10/2006 | Yamada et al. |
| 2006/0256747 | A1 | 11/2006 | Jaakkola |
| 2007/0014269 | A1 | 1/2007 | Sherman et al. |
| 2007/0091889 | A1 | 4/2007 | Xiao et al. |
| 2007/0115813 | A1 | 5/2007 | Hyon et al. |
| 2007/0133478 | A1* | 6/2007 | Armbruster ........... H04L 1/0015 370/335 |
| 2007/0177555 | A1* | 8/2007 | Brueck ................. H04L 12/189 370/338 |
| 2007/0177592 | A1 | 8/2007 | Mooney et al. |
| 2007/0183434 | A1 | 8/2007 | Pandey |
| 2007/0230441 | A1* | 10/2007 | Sethi ..................... H04L 12/18 370/352 |
| 2008/0049703 | A1* | 2/2008 | Kneckt ................ H04W 68/00 370/342 |
| 2008/0049749 | A1 | 2/2008 | Xiao et al. |
| 2008/0056219 | A1 | 3/2008 | Venkatachalam |
| 2008/0062948 | A1 | 3/2008 | Ponnuswamy |
| 2008/0063116 | A1 | 3/2008 | Yokoyama |
| 2008/0170550 | A1 | 7/2008 | Liu et al. |
| 2009/0168683 | A1 | 7/2009 | Franceschini et al. |
| 2010/0039976 | A1* | 2/2010 | Huschke ............ H04W 72/005 370/312 |

OTHER PUBLICATIONS

U.S. Appl. No. 11/586,025, Final Office Action, dated Feb. 27, 2013.
U.S. Appl. No. 11/586,025, Final Office Action, dated Jul. 30, 2009.
U.S. Appl. No. 11/586,025, Final Office Action, dated Mar. 30, 2010.
U.S. Appl. No. 11/586,025, Non-Final Office Action, dated Mar. 2, 2009.
U.S. Appl. No. 11/586,025, Non-Final Office Action, dated May 23, 2012.
U.S. Appl. No. 11/586,025, Non-Final Office Action, dated Oct. 9, 2009.
U.S. Appl. No. 11/586,017, Final Office Action, dated Aug. 7, 2009.
U.S. Appl. No. 11/586,017, Final Office Action, dated Jun. 20, 2012.
U.S. Appl. No. 11/586,017, Final Office Action, dated Oct. 18, 2010.
U.S. Appl. No. 11/586,017, Non-Final Office Action, dated Apr. 22, 2010.
U.S. Appl. No. 11/586,017, Non-Final Office Action, dated Feb. 19, 2009.
U.S. Appl. No. 11/586,017, Non-Final Office Action, dated Mar. 27, 2013.
U.S. Appl. No. 11/586,017, Non-Final Office Action, dated Oct. 5, 2011.

* cited by examiner

152 ─► | ADDRESS INFORMATION 200 | RATE INFORMATION 210 | POWER SAVE INFORMATION (M-DTIM) 220 |

FIG. 2

154 ─► | MULTICAST MAC ADDRESS 300 | MULTICAST TRANSMISSION RATE 310 | M-DTIM 320 | MULTICAST REPORTING INTERVAL 330 |

FIG. 3

156 ─► | TOTAL NUMBER OF MULTICAST FRAMES 400 | TIME OF RECEIPT OF MULTICAST FRAMES 410 | FIRST SEQUENCE NUMBER 420 | LAST SEQUENCE NUMBER 430 | MULTICAST RATE 440 |

FIG. 4A

| 156 → | MEASUREMENT START TIME 450 | MEASUREMENT DURATION 455 | MULTICAST MAC ADDRESS 460 | MULTICAST REPORTING REASON 465 | MULTICAST COUNT 470 | FIRST SEQUENCE NUMBER 475 | LAST SEQUENCE NUMBER 480 | MULTICAST RATE 485 |

*FIG. 4B*

| 156 → | MULTICAST MAC ADDRESS 460 | FIRST SEQUENCE NUMBER 475 | LAST SEQUENCE NUMBER 480 |

*FIG. 4C*

DETERMINATION OF MULTICAST AND CODING RATE

BENEFIT CLAIM; INCORPORATION BY REFERENCE; DISCLAIMER

This application is a Continuation of application Ser. No. 15/863,595 filed on Jan. 5, 2018, which is a continuation of application Ser. No. 14/282,846 filed on May 20, 2014, which is a continuation of application Ser. No. 11/586,017 filed on Oct. 24, 2006, which claims the benefit of priority on U.S. Provisional Patent Application No. 60/843,798 filed on Sep. 12, 2006, all of which are hereby incorporated by reference.

The applicant(s) hereby rescind any disclaimer of claim scope in the parent application(s) or the prosecution history thereof and advice the USPTO that the claims in this application may be broader than any claim in the parent application(s).

FIELD

Embodiments of the invention relate to the field of communications, and in particular, to a network and method for multicast transmissions over shared wireless media in order to achieve reliability, multicast rate control, better spectrum efficiency and battery power conservation.

GENERAL BACKGROUND

Multicast and broadcast transmissions currently are treated the same in many wireless networks. To date, similar treatment of these transmission types has not posed any substantial problems since wireless is a broadcast medium by definition and anyone on the same frequency with the appropriate receiver can receive the signal, irrespective of the destination. However, similar treatment of these transmission types is spectrally inefficient and unreliable in a multi-user wireless network.

As an example, an access point (AP) or base station (BTS) has to make sure that a broadcast is sent at a modulation and coding rate that is acceptable to all wireless devices that are currently in communication with it. Therefore, low (more robust and less efficient) transmission rates are commonly selected to accommodate each and every wireless device, even when a majority of the wireless devices support significantly higher (less robust and more efficient) transmission rates.

Another problem with current multicast communication schemes is the lack of feedback from the receiving wireless devices. This makes the multicast transmission inherently unreliable in a changing wireless environment.

Yet another problem in treating multicast transmissions similar to broadcast transmissions is that, if power-save is supported, the AP or BTS has to coordinate the delivery of multicast to all wireless devices. There is no mechanism to allow the formation of secondary multicast groups to support different Delivery Traffic Indicator Maps (DTIMs) in accordance with IEEE 802.11 standards. As a result, wireless devices may wake up more often than needed, which in turn may drain the battery of certain hand-held devices.

BRIEF DESCRIPTION OF THE DRAWINGS

The invention may best be understood by referring to the following description and accompanying drawings that are used to illustrate embodiments of the invention.

FIG. 2 is an exemplary embodiment of a MCAST_JOIN_REQUEST message transmitted by a multicast receiving device to a multicast transmitting device in order to request joining a multicast group.

FIG. 3 is an exemplary embodiment of a MCAST_JOIN_ACCEPT message transmitted from the multicast transmitting device to the multicast receiving device in order to establish membership within the multicast group.

FIG. 4A is a first exemplary embodiment of a MCAST_STATUS_REPORT message transmitted by the multicast receiving device to the multicast transmitting device in order to provide periodic or asynchronous feedback information for multicast rate control and reliability.

FIG. 4B is a second exemplary embodiment of the MCAST_STATUS_REPORT message in order to provide periodic or asynchronous feedback information for multicast rate control and reliability.

FIG. 4C is a third exemplary embodiment of the MCAST_ STATUS_REPORT message in order to provide periodic or asynchronous feedback information for multicast rate control and reliability.

DETAILED DESCRIPTION

Figure 1A:
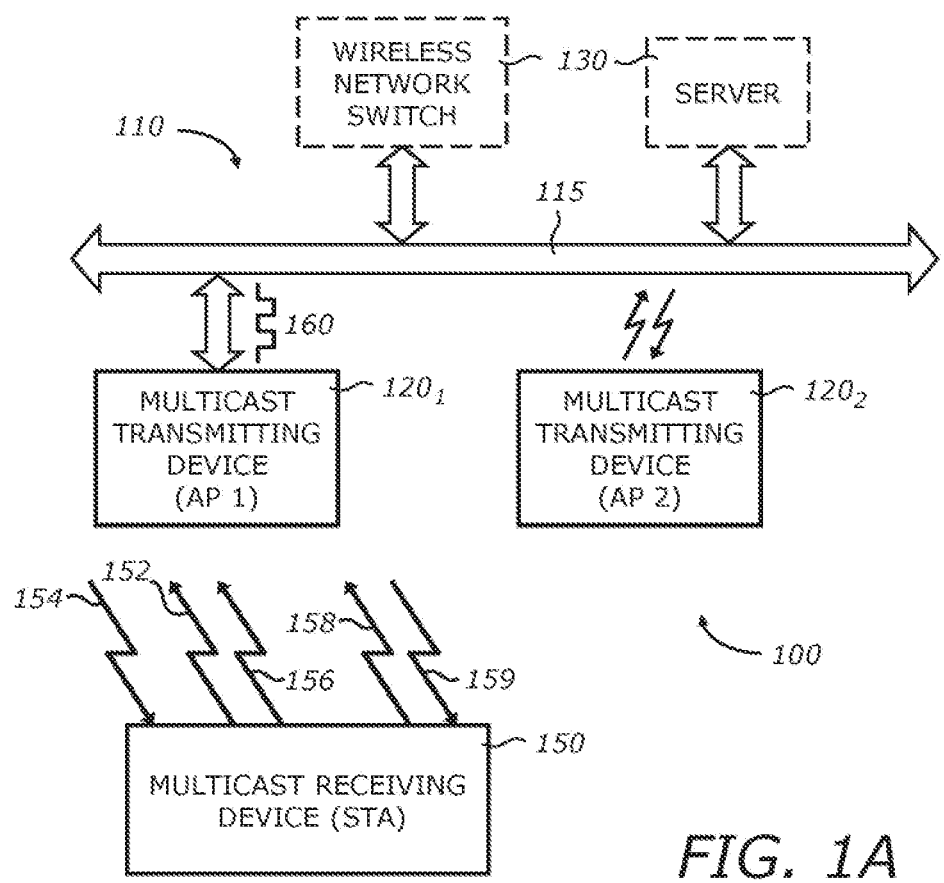
FIG. 1A is an exemplary embodiment of a wireless local area network in accordance with an embodiment of the invention.

Embodiments of the invention relate to a system and method for multicast transmissions over shared wireless media for reliability, multicast rate control, spectrum efficiency and battery power conservation.

Certain details are set forth below in order to provide a thorough understanding of various embodiments of the invention, albeit the invention may be practiced through many embodiments other than those illustrated. Well-known logic and operations are not set forth in detail in order to avoid unnecessarily obscuring this description.

In the following description, certain terminology is used to describe features of the invention. For example, "software" is generally considered to be executable code such as an application, an applet, a routine or even one or more executable instructions stored in a storage medium. Firmware is considered merely one type of software. The "storage medium" may include, but is not limited or restricted to a programmable electronic circuit, a semiconductor memory device inclusive of volatile memory (e.g., random access memory, etc.) and non-volatile memory (e.g., programmable and non-programmable read-only memory, flash memory, etc.), an interconnect medium, a hard drive, a portable memory device (e.g., floppy diskette, a compact disk "CD", digital versatile disc "DVD", a digital tape, a Universal Serial Bus "USB" flash drive), or the like.

A "multicast receiving device" is a wired or wireless device that is adapted to request membership to a multicast group within a network. An example of a multicast receiving device include a "station" (STA), which is any wireless device such as a wireless device that contains an IEEE 802.11 conformant medium access control (MAC) and physical layer (PHY) interface to a wireless interconnect medium. Another example of a multicast receiving device is an access point (AP) when deployed within a wireless mesh network.

A "multicast transmitting device" is a device that is adapted to participate in the granting or denial of membership to a multicast group in response to a request by a multicast receiving device. An example of a multicast receiving device includes, but is not limited or restricted to an AP, which is generally considered to be any entity that has station functionality and provides access to distributed services via the wireless medium for associated STAs. Another example is a wireless network switch that controls multicast grouping in a centralized location.

A "message" is information arranged in a predetermined format that is transmitted over an interconnect medium, namely a wired or wireless pathway for information. One type of message is a "multicast message" that includes information either involved in the formulation of a transmission path for multicast data to one or more multicast receiving devices belonging to a particular group or involved in multicast transmissions.

According to one embodiment of the invention, one type of multicast message is a MCAST_JOIN_REQUEST message that is transmitted from a multicast receiving device and directed to an access point (AP) or other type of multicast transmitting device (e.g., wireless network switch, base station, etc.). Another type of multicast message is a MCAST_JOIN_ACCEPT message that is transmitted from the multicast transmitting device to the multicast receiving device for example. Yet other types of multicast messages include the MCAST_CHANGE_REQUEST message and MCAST_CHANGE_UPDATE message, which are used to (i) dynamically request changes in the wireless multicast group and (ii) identify whether the requested changes have been accepted and updated by the multicast transmitting device, respectively.

I. Establishing Multicast Groups with Different Multicast Rates

Referring to FIG. 1A, an exemplary embodiment of a wireless network 100 is shown. In accordance with one embodiment of the invention, wireless network 100 may be implemented as a wireless local area network (WLAN) including a wired network 110 operating as an Open Source Interconnect (OSI) Layer 2/Layer 3 (L2/L3) network. Wired network 110 supports communications between a plurality of multicast transmitting devices $120_1$-$120_N$ (N>2), such as access point (AP) $120_1$ and AP $120_2$ as shown, and wired resources 130 communicatively coupled to a wired interconnect medium 115. Examples of resources 130 may include, but are not limited or restricted to servers or a wireless network switch since the multicast control techniques described below can be centralized in lieu of being implemented on independent APs.

Of course, it is contemplated that a mesh network may be substituted for wired network 115 of FIG. 1A. Hence, the multicast transmitting devices $120_1$-$120_N$ may be in communication with each other over wireless connections. Moreover, certain multicast transmitting devices (e.g., AP $120_2$) may be able to operate as a multicast receiving device and participate as part of a multicast group.

As shown, multicast transmitting device $120_1$ provides wireless communications with one or more multicast receiving devices 150. According to one embodiment of the invention, multicast transmitting device $120_1$ constitutes an AP while multicast receiving device 150 constitutes a wireless station (STA) that processes information (e.g., portable computer, personal digital assistant "PDA", Voice-over-IP "VoIP" telephone, etc.). While the illustrative embodiments describe the communications between an AP and STA, it is contemplated that the claimed invention generally involves communications between two devices with wireless communications capabilities.

As shown in FIG. 1A, according to one embodiment of the invention, STA 150 may seek to join one or more multicast groups during or after association with a first AP $120_1$. Within wireless network 100, multiple multicast groups may be created, each with its own modulation and coding rate for spectrum efficiency and/or with its own power-save characteristics. More than one multicast group may have the same power-save characteristics (e.g. DTIM interval) and support the same range of multicast modulation and coding (transmission) rates.

In order to join a certain multicast group, STA 150 transmits a wireless message 152 to AP $120_1$, where the formation and transmission of wireless message 152 is controlled by logic, namely hardware and/or software, implemented within STA 150. Herein, wireless message 152 is a request by STA 150 to join as a member of a certain multicast group or multicast stream at a specific maximum transmission rate (hereinafter referred to as a "MCAST_JOIN_REQUEST message"). If the multicast receiving device does not have the knowledge of the maximum multicast rate it can accept, it may not specify the rate in MCAST_JOIN_REQUEST message 152.

As previously stated, MCAST_JOIN_REQUEST message 152 can be generated at any time during or after association. For instance, an Association Request message may carry the MCAST_JOIN_REQUEST message 152 or MCAST_JOIN_REQUEST message 152 may be sent as a separate message after association. As another example, MCAST_JOIN_REQUEST message 152 may be carried in a Re-association Request message, a separate management or action frame or a modified Flexible Broadcast/Multicast Service (FBMS) Request message in accordance with the IEEE 802.11 standard.

Of course, AP $120_1$ may process the information contained in MCAST_JOIN_REQUEST message 152 in order to create, assign or modify multicast groupings or add the requester (e.g., STA 150) to an existing multicast group or stream. Alternatively, it is contemplated that AP $120_1$ may simply convert MCAST_JOIN_REQUEST message 152 into a corresponding wired or wireless message 160 (as shown) for transmission to a wireless network switch or controller 130 if multicast grouping is centrally managed. For this configuration, the operations of AP $120_1$ as described below would, in fact, be performed by wireless network switch or controller 130.

Figure 1B:
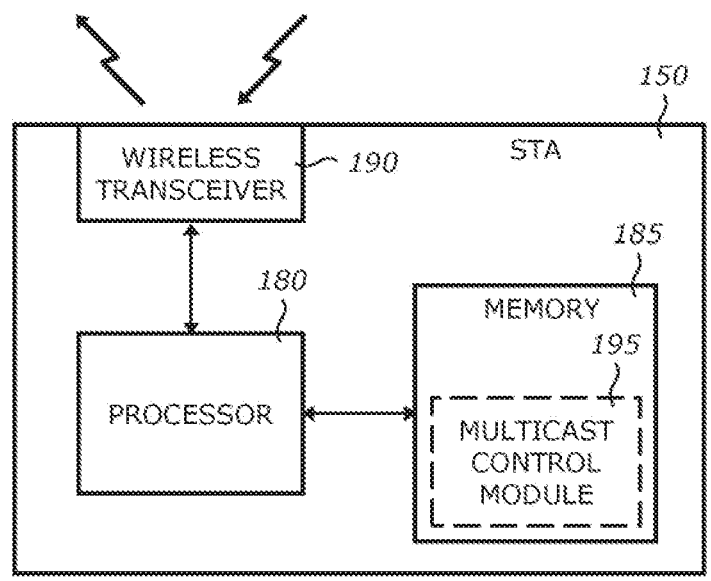
FIG. 1B is an exemplary embodiment of a station in accordance with an embodiment of the invention.

Referring to FIG. 1B, an exemplary embodiment of STA 150 is shown. According to one embodiment of the invention, STA 150 comprises a processor 180, memory 185 and a wireless transceiver 190. More specifically, wireless transceiver 190 operates as the interface for STA 150 and is controlled to receive or transmit messages as well as format assembly and/or disassembly of the messages as needed.

Processor 180 is a component that is responsible for creating outgoing multicast messages and for recovering information from the incoming messages. For instance, processor 180 may be adapted to execute a multicast control module 195 in order to produce a multicast request message with multicast rate information as shown in FIG. 2 and to process a multicast response message as shown in FIG. 3. Module 195 may be software stored in memory 185 or may be stored as firmware or hard wired into STA 150. Examples of various types of components forming processor 180 include, but are not limited or restricted to general purpose processor, application specific integrated circuit, programmable gate array, a digital signal processor, a micro-controller and the like.

Although not shown, one or more APs (e.g., AP 120$_1$) comprise a processor, memory and a wireless transceiver as described above. However, in lieu of multicast control module 195, AP 120$_1$ includes a multicast formation module, normally software that is executed in order to respond to a message from a wireless device, such as STA 150 or even another AP for example, inquiring on support of a multicast request. Such operations of a wireless device and AP are described below.

As illustrated in FIG. 2, an exemplary embodiment of MCAST_JOIN_REQUEST message 152 comprises (i) address information 200, (ii) rate information 210, and/or (iii) power save information 220. According to one embodiment of the invention, address information 200 is uniquely identifiable OSI Layer-2, Layer-3 or higher layer information about the multicast group (hereafter referred to as a "primary multicast group"). For instance, address information 200 may constitute a classifier (e.g., IEEE 802.11 TCLAS information element, MAC address, IP address, port numbers, connection identifiers and stream identifiers) to identify the Layer-2 or higher layer multicast streams.

Rate information 210 denotes the highest or desired rate of modulation coding that STA 150 can accept and reliably support (e.g., 54 megabits per second "Mbps", 1 Mbps, etc.). The rate information may be set to "0," if STA 150 does not know the highest rate or does not want to communicate the rate information for any reason.

As an optional parameter, power save information 220 denotes the power save preferences for STA 150. For instance, according to one embodiment of the invention, power save information 220 identifies a power-save interval, which may be represented as a multiple of beacon or DTIM intervals (M-DTIM). For example, as one exemplary embodiment, a M-DTIM value of "5" represents that STA 150 is requesting a DTIM interval extending five broadcast DTIM cycles (e.g., five times longer than the default time period between broadcast DTIM messages). As a result, if STA 150 is to be configured with more aggressive power-save features, a higher M-DTIM value will be requested.

Referring back to FIG. 1A, based on information provided from both MCAST_JOIN_REQUEST message 152 from multicast receiving device (e.g., STA) 150 and MCAST_JOIN_REQUEST messages from other STAs, AP 120$_1$ is able to create one or more multicast groups with the multicast group(s) supporting dynamically adjustable transmission (modulation and coding) rates for spectrum efficiency.

Since each STA 150 specifies the highest modulation and coding rate that it can receive, AP 120$_1$ can either accept or deny multicast group membership based on the rates and groups that it can support. It is contemplated that each multicast receiving device 150 may be a member of any number of multicast groups while the maximum number of multicast groups supported by wireless network 100 is determined by the AP 120$_1$-120$_N$ and/or the wireless network switch 130.

Upon determining that STA 150 may become a member of a particular multicast group, AP 120$_1$ transmits a MCAST_JOIN_ACCEPT message 154 as shown in FIG. 3. MCAST_JOIN_ACCEPT message 154 comprises two or more of the following: a multicast MAC address 300, a selected multicast transmission rate 310, a selected DTIM interval (M-DTIM) 320 and a multicast reporting interval 330.

Herein, as shown in FIG. 3, multicast MAC address 300 is the unique MAC address for the particular multicast group. This enables STA 150 to determine its membership to certain multicast groups and/or to subsequently monitor for multicast messages directed to this multicast group.

Multicast transmission rate 310 identifies the transmission rate that has been selected by AP 120$_1$ for the multicast service. M-DTIM 320 identifies the selected interval between DTIM multicast transmissions for this multicast group.

Multicast reporting interval 330 is an optional parameter that is designed to improve reliability in an ever-changing wireless environment. Herein, multicast reporting interval 330 identifies a measurement period over which STA 150 should maintain information concerning communications associated with the assigned multicast group. The AP may keep information for a multiple of multicast reporting intervals for this feedback protocol to work reliably. The collected multicast information is transmitted as part of a multicast status report 156 (hereinafter referred to as "MCAST_STATUS_REPORT message") as described below.

Upon receipt of MCAST_JOIN_ACCEPT message 154, the multicast receiving device is a member of the multicast group operating in accordance with the parameters selected by the AP, but can reject membership to the multicast group by association from the particular AP.

II. Multicast Rate Control

As shown, AP 120$_1$ continuously performs multicast rate control by determining the modulation and coding rate to be used by each multicast group. The determination may be performed on a periodic basis or a non-periodic basis such as for each multicast frame, for each transmission series, and the like. AP 120$_1$ may use various types of information in making rate control decisions. For instance, as an illustrative example, multicast rate control decisions may be based on information obtained through feedback signaling such as MCAST_STATUS_REPORT messages 156 from member STAs. Of course, it is contemplated that the multicast rate control operations may be performed between STA and the network switch if the multicast control is centrally managed.

As an illustrative example, feedback signaling for a particular STA is described in FIGS. 4A-4C. This feedback signaling is the result of a feedback mechanism implemented within the STA and other STAs that are members of the specific multicast group, where the collective feedback information is used to control the settings of the multicast transmission rate.

More specifically, as shown in FIGS. 1A and 4A, MCAST_STATUS_REPORT message 156 is transmitted from STA 150 to AP 120$_1$, where feedback (status) information is used for rate control. This feedback information may be periodically or asynchronously initiated (triggered) by STA 150 itself or based on a prior request from AP 120$_1$.

As shown in FIG. 4A, feedback information from STA 150 may be used by AP 120$_1$ to perform multicast rate control and/or restructure the group membership, if needed. Either STA 150 or AP 120$_1$ may request or instruct a change in the group membership, based on a variety of factors, including feedback information received from the multicast receiving device.

According to one embodiment of the invention, this "feedback information" includes a reference to a time window using a common time reference (e.g., TSF or Time Synchronization Function), sequence numbers (e.g., 802.11 MAC sequence numbers) as well as information that can be used for rate control. This feedback (status) information is collected as a multicast report and is provided by STA 150 to AP 120$_1$ within MCAST_STATUS_REPORT message 156. One embodiment of MCAST_STATUS_REPORT message 156 may include, but is not limited or restricted to one or more of the following: (i) total number of multicast frames received during the measurement period 400, (ii) time of receipt of the multicast frames 410, (iii) sequence numbers from sequence control fields within MAC headers of the first and last multicast frames during the measurement period 420 and 430, and/or (iv) current multicast rate 440.

For instance, as an illustrative embodiment, AP 120$_1$ sets a reporting interval (measurement period) of two seconds. As a result, STA 150 is now configured to maintain and transmit information to AP 120$_1$ concerning multicast messages within two second intervals or less. Based on this feedback information, AP 120$_1$ may adjust (increase or decrease) the multicast rate based on estimated frame loss at STA 150 and other STAs within the multicast group.

Referring now to FIG. 4B, a second exemplary embodiment of MCAST_STATUS_REPORT message 156 including feedback (status) information collected by STA 150 for reporting to AP 120$_1$ is shown. As shown, MCAST_STATUS_REPORT message 156 includes, but is not limited or restricted to one or more of the following fields: (i) a measurement start time 450, (ii) a measurement duration 455, (iii) multicast MAC address 460, (iv) a multicast reporting reason 465, (v) a multicast count 470, (vi) a first sequence number 475, (vii) a last sequence number 480 and (viii) a multicast rate 485.

Measurement start time field 450 is set to the specific value of a timer within STA 150 of FIG. 1 when the measurement period has started. For a triggered MCAST_STATUS_REPORT message, this start value occurs when the trigger condition is met at the STA. For multicast performance measurements, however, this field 450 includes a start time value that coincides with reception of a first multicast frame during the measurement duration described below.

Measurement duration field 455 is set to a duration over which the feedback information is measured. For multicast performance measurements in multicast reporting reason field 465, MCAST_STATUS_REPORT message 156 may be sent as often as required to improve the reliability of the multicast transmissions. Measurement duration field 455 is not used in triggered reporting, and thus, is set to logic "0".

Multicast MAC address field 460 contains the MAC address of the multicast traffic (the multicast group) to which MCAST_STATUS_REPORT message 156 relates.

Multicast reporting reason field 465 is a bit field indicating the reason that STA 150 sent MCAST_STATUS_REPORT message 156. According to one embodiment of the invention, although not shown, multicast reporting reason field 465 includes, but is not limited or restricted to (1) a report timeout trigger subfield that is set to indicate that message 156 was generated due to a timing event by STA 150, and (2) a performance measurement subfield to indicate that MCAST_STATUS_REPORT message 156 was sent by a member of the multicast group.

Multicast count field 470 contains a total number of multicast MAC Service Data Units (MSDUs) that were received for a multicast MAC address during the measurement duration. For a triggered multicast reporting measurement, this is the total number of frames received with the indicated Multicast MAC Address.

First sequence number field 475 is the 802.11 sequence number of a first multicast frame received during the measurement period. According to one embodiment of the invention, first sequence number field 475 is used especially if the multicast reporting reason field 465 identifies that the reason for transmission of message 156 is to conduct performance measurements. According to another embodiment of the invention, first sequence number field 475 is set to logic "0" on transmit and ignored upon receipt by AP 120$_1$ if the multicast reporting reason is a timeout trigger.

Last sequence number field 480 is the 802.11 sequence number of the last frame received during the measurement period. According to one embodiment of the invention, last sequence number field 480 is used especially if the multicast reporting reason is set as a "performance measurement". According to another embodiment of the invention, last sequence number field 480 is set to logic "0" on transmit and ignored upon receipt by AP 120$_1$ if the multicast reporting reason is a timeout trigger.

Multicast rate field 485 specifies the highest or desired data rate at which STA 150 can reliably receive multicast frames. If no value is provided by STA 150, this field may be set to logic "0" to denote that such information is currently unavailable to STA 150.

Referring now to FIG. 4C, a third exemplary embodiment of MCAST_STATUS_REPORT message 156 is shown. As shown, MCAST_STATUS_REPORT message 156 includes, but is not limited or restricted to multicast MAC address 460, first sequence number 475 and last sequence number 480. In the event that multicast reporting interval 330 within MCAST_JOIN_ACCEPT message 154 is set to a short duration, both first sequence number 475 and last sequence number 480 may provide sufficient feedback information for AP 120$_1$.

In lieu of or in combination with information provided within multicast status reports from member STAs, AP 120$_1$ (or network switch 130 of FIG. 1A) may use other types of information in making rate control decisions including, but not limited or restricted to some or all of the following: (1) policy or provisioning limits; and/or (2) information gathered from the unicast transmission/reception status to/from the members of the multicast group; and/or (3) signal strength information gathered from any frame from the STAs of the multicast group, including those exchanged as part of the multicast group signaling such as the MCAST_STATUS_REPORT messages.

For policy or provisioning limits, AP 120$_1$ (or wireless network switch 130) may be programmed to follow particular rate transmission setting guidelines. These guidelines may be used as coded rules within software implemented within AP 120$_1$ in order to control the characteristics of supported multicast groups. For instance, as an illustrative example, if the network administrator requires specific APs, inclusive of AP 120$_1$, to support a high-speed network, AP 120$_1$ may be controlled to precluded setting the multicast transmission rate below a certain megabit per second, and/or AP 120$_1$ may be required to set the multicast transmission rate above a certain threshold.

Moreover, information gathered from the unicast transmissions from AP 120$_1$ to STAs that are members of a particular multicast group may be used for adjusting multicast transmission rates. Such information may include the transmission rate used as well as error information experienced for such transmissions. Similarly, information gathered from the unicast transmissions from multicast member STAs to AP $120_1$ may be used.

Signal strength information associated with transmissions from the multicast member STAs may be used by AP $120_1$ (or network switch 130) to alter multicast transmission rates. For instance, if the signal strength is substantially greater than a predetermined threshold, such information may indicate that the multicast member STAs will likely support higher transmission rates.

Referring back to FIG. 1A, it is contemplated that STA 150 may request changes to the rate or DTIM characteristics by sending a MCAST_CHANGE_REQUEST message 158. Although not known, MCAST_CHANGE_REQUEST message 158 includes multicast MAC address and either an altered multicast transmission rate or M-DTIM similar to MCAST_JOIN_ACCEPT message 154 of FIG. 3. In response, AP $120_1$ sends a MCAST_CHANGE_UPDATE message 159 to indicate whether or not the requested change has been granted. If granted, AP $120_1$ may change the rate and/or DTIM characteristics of the primary multicast group. If AP $120_1$ decides to change only the rate and not the M-DTIM value, the AP need not explicitly send an MCAST_CHANGE_UPDATE message.

Referring still to FIG. 1A, in the event that AP $120_1$ determines that STA 150 should not be assigned to a multicast group, MCAST_JOIN_REQUEST message 152 is ignored according to one embodiment of the invention. Alternatively, although not shown, a m may be transmitted from AP $120_1$ to STA 150 identifying reasons for the failure to assign STA 150 to a requested multicast group. Some examples of reasons include the unavailability of resources at the AP and a policy limitation that does not allow the STA to be member of the multicast group or allow the requested rate or DTIM interval. Of course, even if AP $120_1$ transmits MCAST_JOIN_ACCEPT message 154, it is possible that STA 150 would not receive the communication.

III. Establishing and Maintaining Secondary Multicast Groups

In certain situations, it may be desirable to group multicast receiving devices interested in the same multicast stream into secondary multicast groups. This tiered, multicast grouping scheme allows multicast receiving devices that have selected a particular multicast group but have substantially different rates, non-overlapping DTIM (power-saving) values and/or different coverage areas (e.g., using smart antenna, beam-forming or advanced antenna systems) to still be grouped together.

Figures 5, 6:
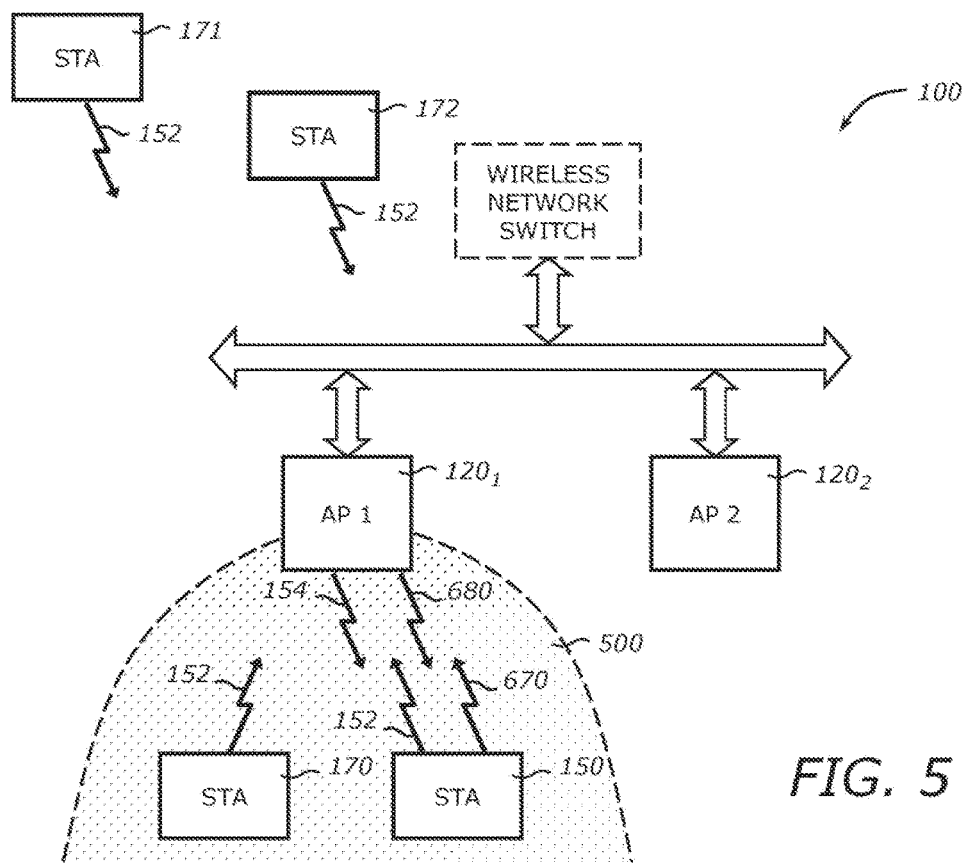
FIG. 5 is an exemplary embodiment of a wireless local area network operating in accordance with establishment of secondary multicast groups.
FIG. 6 is an exemplary embodiment of a MCAST_JOIN_ACCEPT message transmitted from the multicast transmitting device to the multicast receiving device of FIG. 5 in order to establish membership within both primary and secondary multicast groups.

According to one embodiment of the invention, STA 150 transmits MCAST_JOIN_REQUEST message 152 as shown in FIG. 5. MCAST_JOIN_REQUEST message 152 can be generated at any time during or after association. MCAST_JOIN_REQUEST message 152 identifies the requested multicast group (primary multicast group) and provides rate and optionally power save information. The "rate information" denotes the highest rate of modulation coding that STA 150 can accept and reliably support (e.g., 54 megabits per second "Mbps", 1 Mbps, etc.) while the "power save information" may provide a DTIM interval requested by STA 150.

Based on information provided from both the MCAST_JOIN_REQUEST message 152 from STA 150 and MCAST_JOIN_REQUEST messages from other STAs, AP $120_1$ may create or modify a primary multicast group and, depending on the information provided, may create one or more secondary multicast groups. AP $120_1$ determines whether a secondary multicast group is needed based on any number of factors, including transmission rate, M-DTIM, local resource constraints, traffic conditions, available capacity and the like. Illustrative examples of conditions for formulating secondary multicast groups are described below.

For instance, according to one illustrative example, multiple STAs 150 and 170-172 request membership to a first primary multicast group. However, STAs 150 and 170 provided a M-DTIM value that translates into a DTIM interval of 10 beacon intervals while STAs 171 and 172 provided a M-DTIM value that translates into a DTIM interval of 7 beacon intervals. Since these DTIM intervals are overlapping only at seventy (70) beacon intervals, placement of STAs 150 and 170-172 in the same primary multicast group would be difficult without further multicast sub-groupings.

As another illustrative example, STAs 150 and 170-172 request membership to a first primary multicast group. This is accomplished by STAs 150 and 170-172 transmitting a MCAST_JOIN_REQUEST message 152 to AP $120_1$. However, AP $120_1$ features a directional beam antenna, and thus, any multicast broadcasts directed to STA 150 may only be reached by STA 170 as represented by coverage area 500. The multicast broadcasts would not be received by STAs 171 and 172, which are outside coverage area 500 of the transmission. Therefore, placement of STAs 150 and 170-172 in the same primary multicast group would be difficult without further multicast sub-groupings.

Upon determining that STA 150 is to become a member of particular primary and secondary multicast groups, AP $120_1$ transmits MCAST_JOIN_ACCEPT message 154 as shown in FIG. 6. For this embodiment of the invention, MCAST_JOIN_ACCEPT message 154 comprises multicast MAC address 600, primary and secondary multicast group identifiers 610 and 620, a selected multicast transmission rate 630, a DTIM interval 640 and a multicast reporting interval 650. Herein, STAs 150 and 170 would receive the same primary and secondary multicast identifiers, which are values to identify particular multicast groups separate from MAC address 600. However, STAs 150 and 170 would receive the same primary multicast identifier and different multicast identifiers as STAs 171 and 172.

Similarly, STA 150 may request changes to the multicast transmission rate or DTIM characteristics (M-DTIM) by sending a MCAST_CHANGE_REQUEST message 670. Different from MCAST_CHANGE_REQUEST message 158 of FIG. 1, MCAST_CHANGE_REQUEST message 670 further includes primary and/or secondary multicast group identifiers 610 and 620. AP $120_1$ sends a MCAST_CHANGE_UPDATE message 680 to indicate whether requested change as been granted. If granted or partially granted, AP $120_1$ may change the multicast transmission rate and/or DTIM characteristics by reassigning STA 150 to be a member of a different secondary multicast group that has a different rate or DTIM interval.

IV. Formation of Primary and Secondary Multicast Groups

Figure 7A:
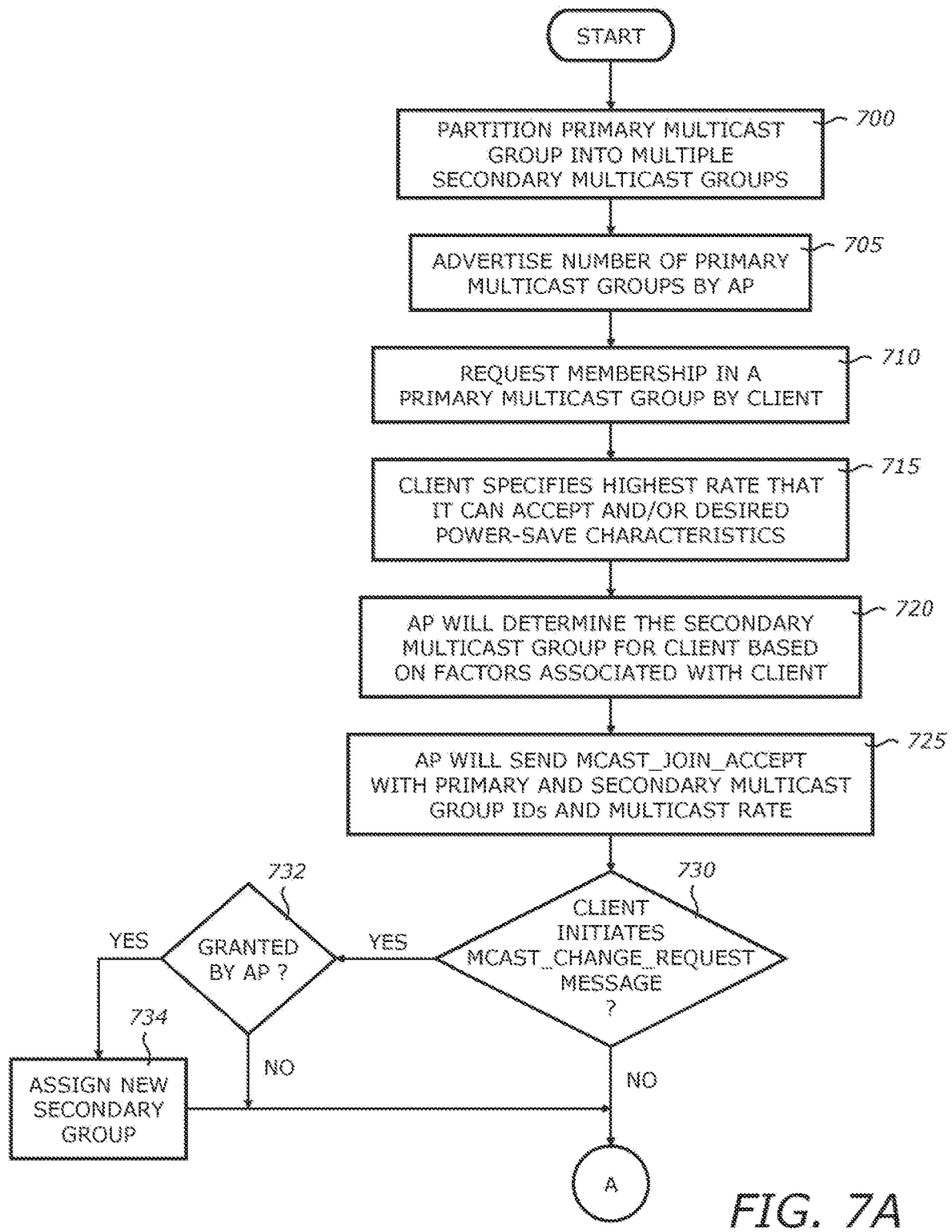
FIGS. 7A-7B is an exemplary flowchart illustrating the operations performed by the system, such as a multicast receiving and multicast transmitting device, in order to establish multicast groups over a shared wireless interconnect medium for reliability, multicast rate control, spectrum efficiency and battery power conservation.
Figure 7B:
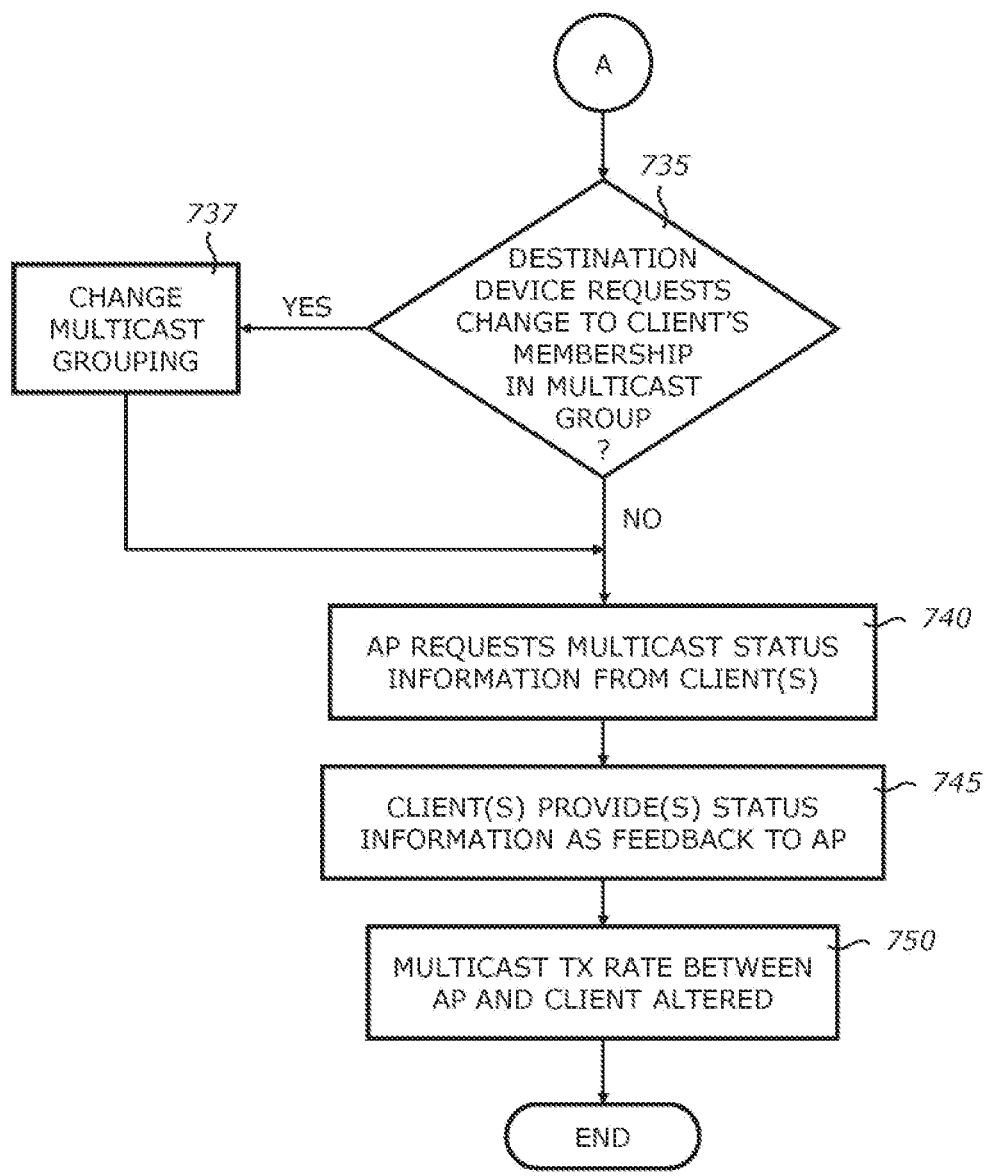

Referring now to FIGS. 7A-7B, an exemplary embodiment of a flowchart for conducting multicast transmissions over shared wireless interconnect medium for spectrum efficiency and battery power conservation is shown.

An AP may partition a higher layer multicast group (primary multicast group) into multiple layer-2 multicast groups (secondary multicast groups), based on the current traffic, radio frequency (RF) environment, and the quality of the link between AP and various multicast receiving devices.

With respect to block 705, a multicast transmitting device (e.g., AP) may advertise the number of higher layer (primary) multicast groups supported in a broadcast frame such as beacons. Alternatively, the AP may only advertise the multicast capability without advertising the supported groups and only accept multicast join requests based on a well-defined classifier such as TCLAS or addressing information.

A multicast receiving device may request membership in a primary multicast group, as part of an association request or a separate MCAST_JOIN_REQUEST message (block 710). The multicast receiving device may specify the highest transmission rate it can accept for the multicast and the desired power-save characteristics as a multiple of beacon intervals (M-DTIM) as shown in block 715.

Thereafter, the multicast transmitting device will determine the secondary multicast group for this multicast receiving device, based on the rate, M-DTIM, local resource constraints, traffic conditions, available capacity and other factors (block 720). According to one embodiment of the invention, membership of a specific device to a particular secondary multicast group depends on a number of factors: (1) the selected primary multicast group that the multicast receiving device is interested in; and/or (2) the highest (most efficient) modulation and coding rate that can be used for robust communication with the multicast receiving device; and/or (3) the power-save requirements of the multicast receiving device; and/or (4) other physical constraints such as the directional antenna, rate capabilities, beam-forming or advanced antenna configuration.

After such determination, the AP will send the MCAST_JOIN_ACCEPT message with the primary and secondary multicast group identifier, associated multicast MAC address, multicast rate and M-DTIM value to the multicast receiving device (block 725). The multicast receiving device only wakes up on its M-DTIM interval or at M-DTIM and DTIM intervals depending on whether it is interested in all broadcast or multicast.

After the multicast receiving device joins a wireless multicast group, it may request changes to the rate or DTIM characteristics by sending a MCAST_CHANGE_REQUEST message. The AP may or may not grant the requested change. If granted, the AP may assign another secondary multicast group belonging to the same primary multicast group (blocks 730, 732 & 734). Similarly, the multicast transmitting device may instruct the multicast receiving device to move from one multicast group to another (primary or secondary) multicast group based on local conditions or the action of another member (blocks 735 and 737).

At certain times, the multicast transmitting device may request multicast reception status from one or all members by transmitting one or more MCAST_STATUS_REPORT_REQUEST messages (block 740). This message(s) may be a unicast of multicast message. In response, the recipient multicast receiving device provides status to the multicast transmitting device using the MCAST_STATUS_REPORT message as described above (block 745). Alternatively, in lieu of a request/response scheme, the transmission of feedback (status) information may be based on a locally defined threshold or application trigger as describe above. According to one embodiment of the invention, the status information includes the number of multicast frames received between two 802.11 sequence numbers.

In addition, the multicast transmitting device may provide MCAST_STATUS to the multicast receiving device, indicating a change (e.g., rate, DTIM interval, etc.) based on the error rate (block 750). In other words, based on the error rate, the multicast transmitting device may perform the change without assistance from the multicast receiving device or the multicast receiving device may request a change in multicast groups (primary and/or secondary) accordingly.

V. Power Saving Operations

As previously mentioned, power saving parameters (M-DTIM) can be negotiated by each multicast receiving device. As a result, upon deciding to enter into a power-save mode, the multicast receiving device transmits a signal to its associated AP (e.g., AP $120_1$) to indicate that it is going to enter into a power-save mode. Concurrently, the multicast receiving device aligns itself with the DTIM messages being transmitted in order to determine the DTIM interval for AP $120_1$. Thereafter, a counter is set to a predetermined value and decremented (or counter is reset and incremented) to cause the STA to exit power-save mode at perhaps different time intervals than other multicast member STAs. This provides a more efficient and better tailored power saving mechanism.

While the invention has been described in terms of several embodiments, the invention should not limited to only those embodiments described, but can be practiced with modification and alteration within the spirit and scope of the appended claims. For instance, according to another embodiment of the invention, multicast determinations may be conducted by a wireless network switch, where APs or BTS operate as gateways for transmission purposes. Also, it is contemplated that the messages described may be information elements so that the functionality of the MCAST_JOIN_REQUEST, MCAST_JOIN_ACCEPT and MCAST_STATUS_REPORT_REQUEST messages may be implemented within the FBMS Request element, the FBMS Response element and the Multicast RateSet information element, respectively. The description is thus to be regarded as illustrative instead of limiting.

What is claimed is:

1. An access point comprising:
   a hardware processor; and
   a non-transitory machine-readable storage medium encoded with instructions executable by the hardware processor to perform operations comprising:
   receiving a request message from a wireless device, the request message identifying a multicast group of the access point and a desired power-save characteristic of the wireless device, and
   transmitting an accept message to the wireless device, the accept message accepting the desired power-save characteristic.

2. The access point of claim 1, wherein the operations further comprise:
   communicating with the wireless device in the multicast group.

3. The access point of claim 1, wherein the desired power-save characteristic comprises a desired delivery interval.

4. The access point of claim 3, wherein the desired delivery interval is a multiple of a beacon interval of the access point.

5. The access point of claim 3, wherein the operations further comprise:
   communicating with the wireless device only according to the desired delivery interval.

6. The access point of claim 1, wherein the request message includes a request to join the multicast group.

7. The access point of claim 1, wherein the wireless device is a member of the multicast group.

8. A wireless device comprising:
a hardware processor; and
a non-transitory machine-readable storage medium encoded with instructions executable by the hardware processor to perform operations comprising:
transmitting a request message to an access point, the request message identifying a multicast group of the access point and a desired power-save characteristic of the wireless device, and
receiving an accept message from the access point, the accept message accepting the desired power-save characteristic.

9. The wireless device of claim 8, wherein the operations further comprise:
communicating with the access point in the multicast group.

10. The wireless device of claim 8, wherein the desired power-save characteristic comprises a desired delivery interval.

11. The wireless device of claim 10, wherein the desired delivery interval is a multiple of a beacon interval of the access point.

12. The wireless device of claim 10, wherein the operations further comprise:
communicating with the access point only according to the desired delivery interval.

13. The wireless device of claim 8, wherein the request message includes a request to join the multicast group.

14. The wireless device of claim 8, wherein the wireless device is a member of the multicast group.

15. A method for an access point, comprising:
receiving a request message from a wireless device, the request message identifying a multicast group of the access point and a desired power-save characteristic of the wireless device; and
transmitting an accept message to the wireless device, the accept message accepting the desired power-save characteristic.

16. The method of claim 15, wherein the operations further comprise:
communicating with the wireless device in the multicast group.

17. The method of claim 15, wherein the desired power-save characteristic comprises a desired delivery interval.

18. The method of claim 17, wherein the desired delivery interval is a multiple of a beacon interval of the access point.

19. The method of claim 17, wherein the operations further comprise:
communicating with the wireless device only according to the desired delivery interval.

20. The method of claim 15, wherein the request message includes a request to join the multicast group.

* * * * *